United States Patent
Fudim et al.

(10) Patent No.: US 7,447,177 B2
(45) Date of Patent: Nov. 4, 2008

(54) METHOD AND APPARATUS OF SECURE ROAMING

(75) Inventors: Max Fudim, Kiryat Bialik (IL); Boris Ginzburg, Haifa (IL); Marc Jalfon, Zichron Yaakov (IL)

(73) Assignee: Intel Corporation, Santa Clara, CA (US)

( * ) Notice: Subject to any disclaimer, the term of this patent is extended or adjusted under 35 U.S.C. 154(b) by 1026 days.

(21) Appl. No.: 10/647,212

(22) Filed: Aug. 26, 2003

(65) Prior Publication Data

US 2005/0047361 A1 Mar. 3, 2005

(51) Int. Cl.
*H04Q 7/00* (2006.01)

(52) U.S. Cl. .................. 370/331; 455/436; 455/574

(58) Field of Classification Search .................. None
See application file for complete search history.

(56) References Cited

U.S. PATENT DOCUMENTS

| | | | |
|---|---|---|---|
| 5,991,287 A * | 11/1999 | Diepstraten et al. | 370/338 |
| 6,587,680 B1 | 7/2003 | Hansen et al. | |
| 7,177,637 B2 * | 2/2007 | Liu et al. | 455/426.1 |
| 2003/0169713 A1 * | 9/2003 | Luo | 370/338 |

FOREIGN PATENT DOCUMENTS

| | | |
|---|---|---|
| EP | 0 851 631 | 7/1998 |
| EP | 0 851 633 | 7/1998 |
| EP | 1 311 086 | 5/2003 |
| EP | 1 322 091 | 6/2003 |

OTHER PUBLICATIONS

"The Robust Security Network", IEEE Medium Access Control (MAC) Security Enhancements, P802.11i/D4.0, May 2003.
IEEE-SA Standards Board, "Part 11: wireless LAn Medium Access Control (MAC) and Physical Layer (PHY) specification", IEEE STD 802.11, Jun. 12, 2003, pp. 1-59.
Search Report and Written Opinion for PCT/US2004/025098, mailed Dec. 9, 2004.
Search Report from GB 0418886.8, mailed on Feb. 16, 2005.

* cited by examiner

*Primary Examiner*—Chau Nguyen
*Assistant Examiner*—Dargaye H Churnet
(74) *Attorney, Agent, or Firm*—Pearl Cohen Zedek Latzer, LLP

(57) ABSTRACT

Briefly, a method and apparatus that may enable roaming of a station from a first access point to a second access point by presenting a power saving mode to the first access mode while establishing a secured connection with the second access point.

27 Claims, 3 Drawing Sheets

METHOD AND APPARATUS OF SECURE ROAMING

BACKGROUND OF TILE INVENTION

In wireless local area networks (WLAN) some data transactions between devices of a basic service set (BSS) may be secured. Security for WLAN, for example a WLAN that complies with IEEE Standard 802.11, may include at least three components: an authentication mechanism or framework, an authentication algorithm, and data frame encryption.

IEEE standard 802.1X-2001 "Port Based Network Access Control" may be used as an authentication mechanism or framework for the WLAN and may provide authentication protocol to the WLAN based on the IEEE 802.11 standard. The IEEE 802.1X standard may enable scaling of WLANs by allowing centralized authentication of wireless users or stations. The IEEE 802.1X standard may allow multiple authentication algorithms and may configure the devices of the BSS with a desired authentication algorithm.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
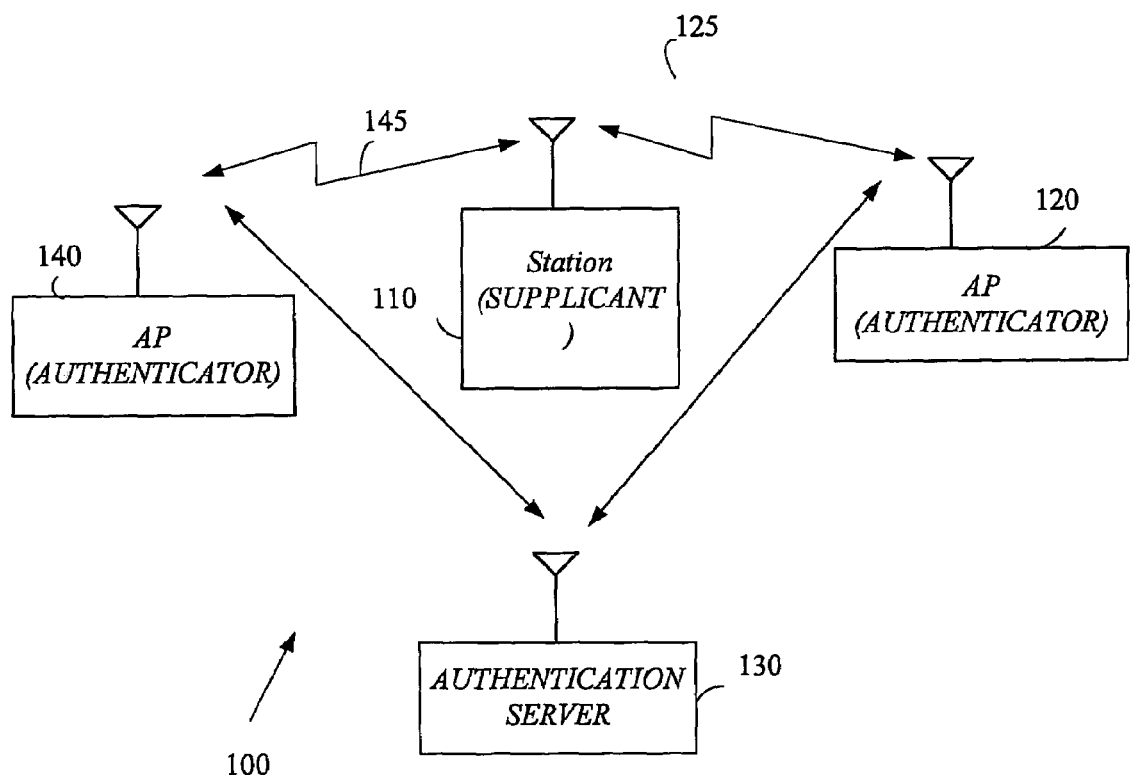
FIG. 1 is a schematic illustration of a wireless communication system according to an exemplary embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Some portions of the detailed description, which follow, are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

It should be understood that the present invention may be used in a variety of applications. Although the present invention is not limited in this respect, the circuits and techniques disclosed herein may be used in many apparatuses such as stations of a wireless communication system. Stations intended to be included within the scope of the present invention include, by way of example only, wireless local area network (WLAN) stations, two-way radio stations, digital system stations, analog system stations, cellular radiotelephone stations, and the like.

Types of WLAN stations intended to be within the scope of the present invention include, although are not limited to, mobile stations, access points, stations for receiving and transmitting spread spectrum signals such as, for example, Frequency Hopping Spread Spectrum (FHSS), Direct Sequence Spread Spectrum (DSSS), Complementary Code Keying (CCK), Orthogonal Frequency-Division Multiplexing (OFDM) and the like.

Turning first to FIG. 1, a wireless communication system 100, for example, a WLAN communication system is shown. Although the scope of the present invention is not limited in this respect, the exemplary WLAN communication system 100 may be defined, e.g., by standard IEEE 802.11-1999, as a basic service set (BSS). For example, BSS may include at least one station such as, for example, an access point (AP) 120 and at least one additional station 110, for example, a mobile unit (MU). In some embodiments, station 110 and AP 120 may transmit and/or receive one or more data packets over WLAN communication system 100. The data packets may include data, control messages, network information, and the like. Additionally or alternatively, in other embodiments of the present invention, WLAN communication system 100 may be a secured network and may include an authentication server 130 to provide a desired authentication algorithm to AP 120 and/or to an AP 140, if desired. In this exemplary embodiment, links 125 and 145 may be secured links. Station 110 may roam from AP 120 to AP 140 and remain with the secured connection.

Although the scope of the present invention is not limited in this respect, in a secured WLAN, for example, WLAN communication system 100, APs 120 and 140 may be referred to as "authenticators", and station 110 may be referred as "supplicant". In some embodiments, IEEE standard 802.1X-2001 may be used to secure links 125 and 145. The IEEE 802.1X standard may use an authentication protocol known as Extensible Authentication Protocol (EAP) and may encapsulate EAP messages over the WLAN.

In some embodiments of the present invention station 110 may include supplicant software and/or hardware and APs 120 and 140 may include authenticator software and/or hardware. Although the scope of the present invention is not limited in this respect, authentication server 130 may include, for example, a Remote Authentication Dial-In User Service server (RADIUS) and may operate security protocols such as, for example, internet protocol security protocol (IPsec), transport layer security protocol (TLS), or the like.

Although the scope of the present invention is not limited in this respect, an example of establishment of a secure communication with a single AP, for example, AP 120, may be as follows: station 110 may try to connect to AP 120. AP 120 may detect station 110 and may enable a port of station 110. AP 120 may force the port of station 110 into an unauthorized state to enable a desired authenticated traffic to be forwarded while blocking unauthorized traffic, such as, for example, traffic of a Dynamic Host Configuration Protocol, HTTP, FTP, Simple Mail Transfer Protocol, Post Office Protocol, and the like. Station 110 may then send an EAP-start message to AP 120. AP 120 may reply with an EAP-request identity message to obtain a client's identity. An EAP-response packet containing the client's identity may then be forwarded to authentication server 130.

Although the scope of the present invention is not limited in this respect authentication server 130 may be configured to authenticate clients, for example, station 110, using a desired authentication algorithm. The result may be in the form of an "accept" or "reject" packet sent from authentication server 130 to AP 120. Upon receiving an accept packet, AP 120 may transition the port of station 110 to an authorized state, allowing traffic to be forwarded.

Although the scope of the invention is not limited in this respect, station 120 may include first and second ports to communicate with first and second ports of first and second APs, e.g., AP 120 and AP 140, respectively. Station 110 may roam from AP 120 to AP 140. In this scenario, station 110 may present a power saving mode to AP 120 and may start to establish a secure connection with AP 140 as described above. However, before the transition of AP 140 port into authorized mode, station 110 may present a power saving mode to AP 140 and may be disassociated from AP 120. For example, station 110 may send an EAP-logoff message to AP 120. In response, AP 120 may transition the first port of station 110 to an unauthorized state. Station 110 may exit power saving mode with AP 140, and AP 140 may transition the second port of station 110 to an authorized state, allowing traffic to be forwarded.

Figure 2:
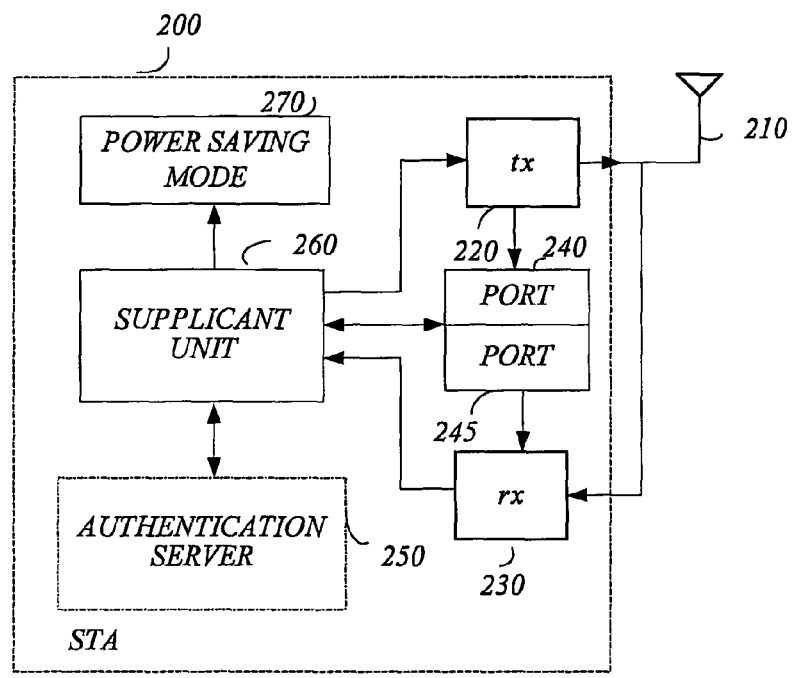
FIG. 2 is a block diagram of a station according to some exemplary embodiments of the present invention.

Turning to FIG. 2, a block diagram of a station 200 according to some exemplary embodiments of the present invention is shown. Although the scope of the present invention is not limited in this respect, station 200 may include an antenna 210, a transmitter (TX) 220, a receiver (RX) 230 a first port 240, a second port 245, a supplicant unit 260 and a power saving mode activation unit 270. Additionally and/or alternatively, in some embodiments of the invention, station 200 may include an authentication server 250 (shown with dotted line).

Although the scope of the present invention is not limited in this respect, antenna 210 may be used to enable secured communication with access point, e.g., AP 120 and/or AP 140. Antenna 210 may be an internal antenna, omni-directional antenna, a monopole antenna, a dipole antenna, an end fed antenna, a circularly polarized antenna, a micro-strip antenna, a diversity antenna and the like.

Although the scope of the present invention is not limited in this respect, station 200 may include a transmitter (IX) 220 and a receiver (RX) 230, to transmit and receive signals, respectively. In some embodiments, supplicant unit 260 may include a software module to establish a secured link with an AP. However, in some other embodiment of the invention, supplicant unit 260 may be implemented in hardware and/or in combination of hardware and software, if desired. Supplicant unit 260 may provide station 200 with a secured connection to AP 120 and/or AP 140.

Although the scope of the present invention is not limited in this respect, station 200 may roam from AP 120 to AP 140, supplicant unit 260 may activate power saving mode activation unit 270 to present a power saving mode to AP 120 while establishing the secured connection with the AP 140. Supplicant unit 260 may control port 245 to transfer only authenticated data packets to TX 220 and/or from RX 230 and to block unauthenticated data packets. Supplicant unit 260 may create port authentication entities (PAE) on port 245.

In some embodiments of the present invention, supplicant unit 260 and authentication server 250 may be involved in the PAE creation, if desired. For example, supplicant unit 260 may authorized port 240 while engaging in secured communication with AP 120, and may unauthorized port 245, or vice versa. While presenting a power saving mode to AP 120, supplicant unit 260 may associate station 200 with AP 140 through port 245 and may establish an authenticated link, for example, link 145. AP 120 may buffer the data packets that may be transmitted to station 200. After successful establishment of a secured link with AP 140, supplicant unit 260 may collect the buffered data from AP 120, disassociate from AP 120, unauthorize port 240, associate with AP 140, and authorized port 245, if desired.

Figure 3:
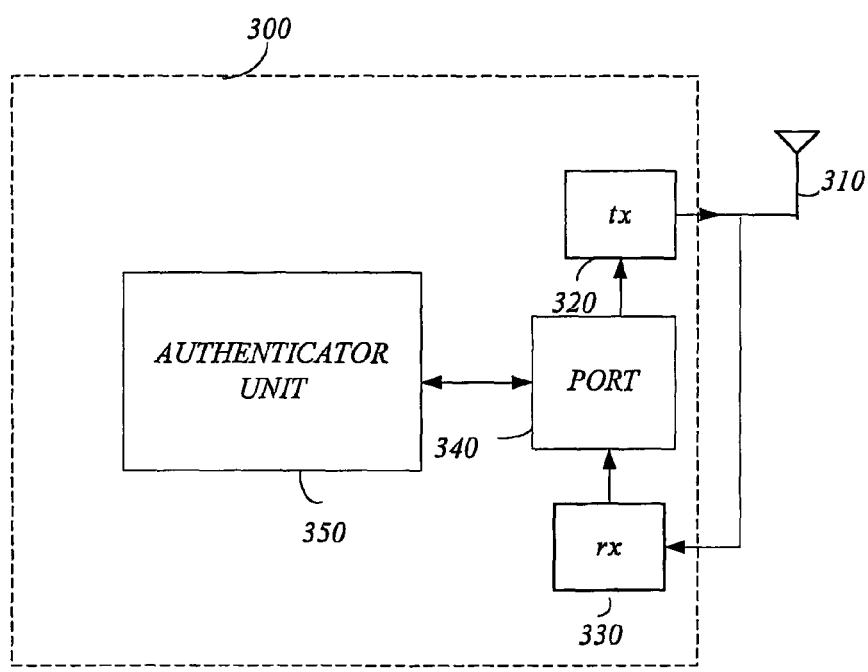
FIG. 3 is a block diagram of an access point (AP) of a WLAN according to an exemplary embodiment of the present invention.

Turning to FIG. 3 a block diagram of an AP 300 according to some exemplary embodiments of the present invention is shown. Although the scope of the present invention is not limited in this respect, AP 300 may include at least one antenna 310, a transmitter (TX) 320, a receiver (RX) 330, a port 340, and an authenticator unit 350.

Although the scope of the present invention is not limited in this respect, antenna 310 may be an internal antenna, omni-directional antenna, a monopole antenna, a dipole antenna, an end fed antenna, a circularly polarized antenna, a micro-strip antenna, a diversity antenna and the like.

Although the scope of the present invention is not limited in this respect, TX 320 and RX 330 may transmit and receive data packets, respectively.

Although the scope of the present invention is not limited in this respect, in some embodiments, authenticator unit 350 may be include a software and/or hardware module to establish a secured link with stations, e.g., station 200, if desired. Authenticator unit 350 may provide the secured connection with station 200 by creating PAE on port 340 and commanding supplicant unit 260 to create PAE on at least one of ports 240, 245, although the scope of the present invention is not limited in this respect.

Figure 4:
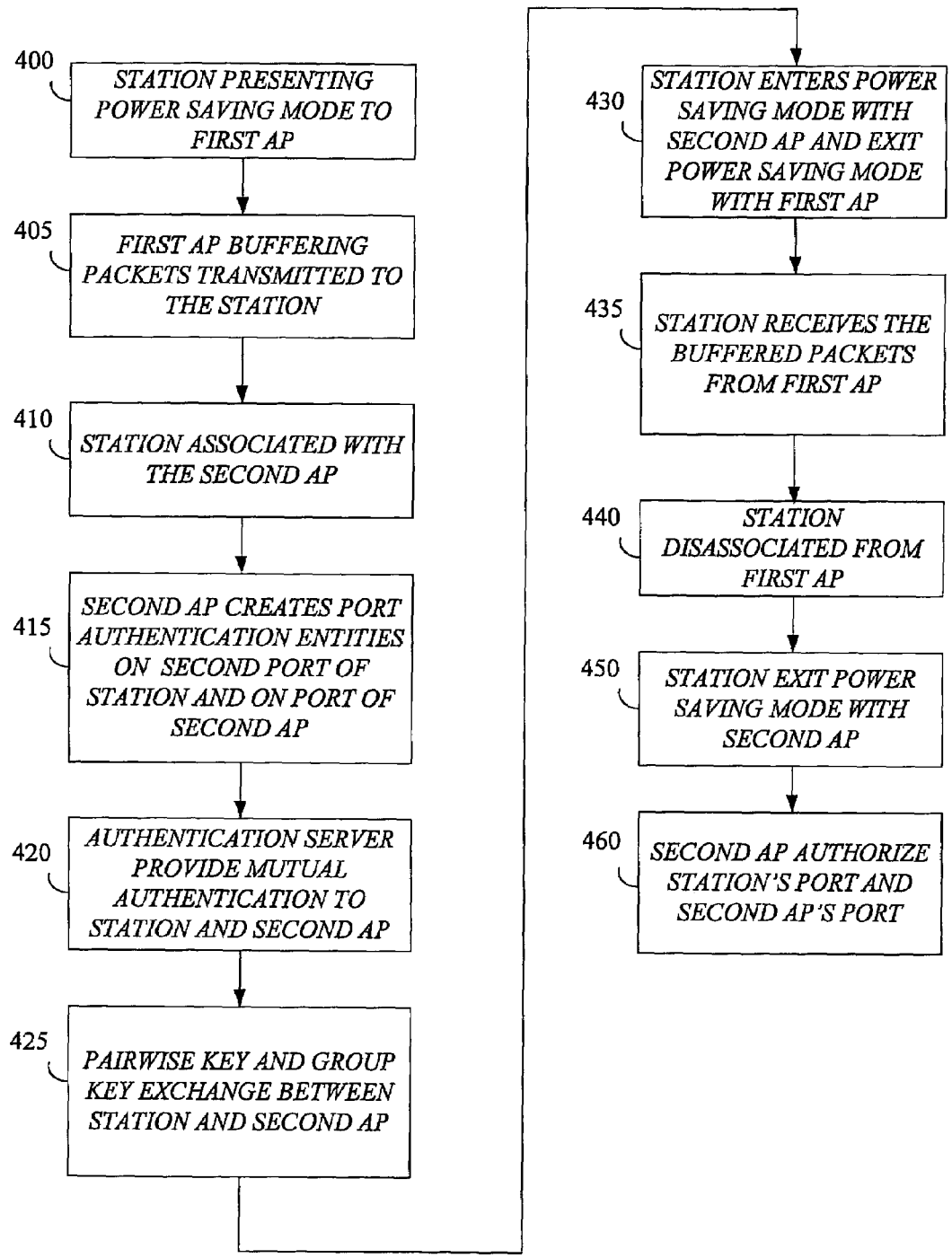
FIG. 4 is a flowchart of a method of roaming according to some exemplary embodiments of the present invention.

Turning to FIG. 4, a flowchart of a method of roaming from one AP to another AP according to some exemplary embodiments of the present invention is shown. Although the scope of the present invention is not limited in this respect, roaming from AP 120 to AP 140 may start with a station, for example station 110, presenting power saving mode to AP 120 (text box 400). In response, although the scope of the present invention is in no way limited to this respect, AP 120 may buffer the data packets transmitted to station 110 (text box 405). Station 110 may associate with AP 140 (text box 410) and AP 140 may create port authentication entities (PAE) on the second port of station 110 and on a port of AP 140 (text box 415). In some embodiments of the present invention the supplicant unit of station 110, the authenticator unit of AP 140, and authentication server 130 may be involved in the PAE creation, if desired.

In some embodiments, authentication server 130 may provide mutual authentication to station 110 and AP 140 (text box 420). In some other embodiment of the invention, station 110 may include an authentication server, e.g., authentication server 250 of station 200 (FIG. 2), to provide the mutual authentication to station 110 and AP 140, if desired. Although the scope of the present invention is not limited in this respect, the authentication process may proceed with pair-wise keys and group keys exchange between station 110 and AP 140 (text box 425).

Although the scope of the present invention is not limited in this respect, after the initiation of secure link with AP 140, for example, link 145, the second port of station 110 may be in an authorized mode. Station 110 may present a power saving mode to AP 140. Station 110 may exit the power saving mode with AP 120 (text box 430) and the first port of station 110 may be authorized. Station 110 may receive buffered data packets from AP 110 (text box 435), may disassociate form AP 120 (text box 440), and may exit power saving mode with AP 140 (text box 450). AP 140 may to establish a secured connection by authorizing the second port of station 110 as well as its own port, (text box 460).

Although the scope of the present invention is not limited in this respect, presenting and/or exiting the power saving mode may be performed by sending a message from station 110 to a desired AP, for example, AP 120 or AP 140. In some embodiments of the invention the message may include a null-data with a power saving (PS) bit turned "on" or "off".

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A method of secure roaming from a first access point to a second access point comprising:
    operating in a secured connection on a first port with the first access point;
    presenting a first power saving mode on the first port to the first access point;
    establishing the secured connection on a second port with the second access point;
    presenting a second power saving mode on the second port to the second access point while dissociating with said first access point; and
    exiting the second power saving mode on the second port.

2. The method of claim 1, wherein establishing the secure connection comprises:
    associating with the second access point; and
    creating a port authentication entity on the second port with the second access point.

3. The method of claim 2, further comprising:
    after exiting the first power saving mode with said first access point, receiving buffered data from the first access point.

4. The method of claim 2, comprising:
    unauthorizing the first port;
    disassociating from the first access point;
    authorizing the second port; and
    associating with the second access point.

5. An apparatus capable of secure roaming from a first access point to a second access point comprising:
    a supplicant unit to provide first and second secured connections to a first and a second access point on first and second ports, respectively, and to present a power saving mode to the first access point while unauthorizing the second port to enable establishment of the second secured connection with the second access point, wherein the supplicant unit is able to present the power saving mode to the second access point while disassociating with the first access point.

6. The apparatus of claim 5, wherein the supplicant unit is able to present the power saving mode to the second access point and to receive buffered data from the first access point.

7. The apparatus of claim 5, wherein the first port is authorized and the second port is in an unauthorized mode while performing a secured communication with the first access point.

8. The apparatus of claim 5, wherein the second port is authorized and the first port is in an unauthorized mode while in secured communication with the second access point.

9. A wireless communication system comprising:
    a station to roam from a first secure link with a first access point to a second secure link with a second access point, wherein the station includes a supplicant unit to present a first power saving mode to the first access point while establishing the secured connection with the second access point and a second power saving mode with the second access point while disassociating with the first access point.

10. The wireless communication system of claim 9, wherein the supplicant unit is able to associate with the second access point while presenting the power saving mode to the first access point and to establish an authenticated link with the second access point.

11. The wireless communication system of claim 10, wherein the supplicant unit is able to present a power saving mode to the second access point to receive buffered data from the first access point.

12. The wireless communication system of claim 9, further comprising:
    an authentication server to provide an authentication protocol to the first and second secured links between the station and the first and second access points, respectively.

13. The wireless communication system of claim 9, wherein the station comprises a supplicant unit to enable authentication.

14. The wireless communication system of claim 9, wherein the first and second access points comprises an authenticator unit to enable the station to maintain a secured communication with at least one of the first and second access point.

15. The wireless communication system of claim 12, wherein the authentication server is configured as a remote authentication dial-in user service (RADIUS) server.

16. The wireless communication system of claim 12, wherein the authentication protocol comprises an extensible authentication protocol.

17. The wireless communication system of claim 12 comprising a wireless local area network.

18. The wireless communication system of claim 9, wherein the first port is authorized while performing the secured communication with the first access point and the second port is in unauthorized to enable an authentication protocol to initiate the secure connection with the second access point.

19. The wireless communication system of claim 9, wherein the second port is authorized while performing a secured communication with the second access point and the first port is unauthorized.

20. A mobile station capable of secure roaming from a first access point to a second access point comprising:
    an internal antenna to transmit and receive secured communications; and
    a supplicant unit to provide first and second secured connections to a first and a second access point on a first and second ports, respectively, and to present a power saving mode to the first access point while unauthorizing the second port to enable establishment of second secured connection with the second access point, wherein the supplicant unit is able to present the power saving mode to the second access point while disassociating with the first access point.

21. The mobile station of claim 20, wherein the supplicant unit is able to present the power saving mode to the second access to receive buffered data from the first access point.

22. The mobile station of claim 20, wherein the first port is authorized while performing a secured communication with the first access point and wherein the second port is in an unauthorized mode.

23. The mobile station of claim 20, wherein the second port is authorized while in secured communication with the second access point and the first port is in an unauthorized mode.

24. An article comprising: a storage medium, having stored thereon instructions, that when executed, result in:
   operating in a secured connection on a first port with the first access point;
   presenting a first power saving mode to on the first port the first access point;
   establishing the secured connection on a second port with the second access point;
   presenting a second power saving mode on the second port to the second access point while dissociating with said first access point; and
   exiting the second power saving mode on the second port.

25. The article of claim 24, wherein the instructions when executed, result in at least initiating establishing a secured connection with the second access point by:
   associating wit the second access point; and
   creating a port authentication entity on the second port with the second access point.

26. The article of claim 25, wherein the instructions when executed, result in:
   after exiting the first power saving mode with said first access point, receiving buffered data from the first access point.

27. The article of claim 25, wherein the instruction when executed, result in:
   unauthorizing the first port;
   disassociating from the first access point;
   authorizing the second port; and
   associating wit the second access point.

* * * * *